United States Patent
Harris et al.

(10) Patent No.: US 9,028,937 B2
(45) Date of Patent: May 12, 2015

(54) MULTILAYER PROTECTIVE TEXTILE SLEEVE AND METHOD OF CONSTRUCTION

(75) Inventors: David A. Harris, Coatesville, PA (US); G. Christopher Thierolf, Abington, PA (US); Danny Winters, Downingtown, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 1059 days.

(21) Appl. No.: 12/349,264

(22) Filed: Jan. 6, 2009

(65) Prior Publication Data

US 2009/0226653 A1  Sep. 10, 2009

Related U.S. Application Data

(60) Provisional application No. 61/019,458, filed on Jan. 7, 2008.

(51) Int. Cl.
| | |
|---|---|
| *B32B 1/08* | (2006.01) |
| *D03D 11/00* | (2006.01) |
| *D03D 15/00* | (2006.01) |
| *B32B 3/10* | (2006.01) |
| *B32B 5/02* | (2006.01) |
| *B32B 5/26* | (2006.01) |
| *H02G 3/04* | (2006.01) |

(52) U.S. Cl.
CPC ............. *B32B 1/08* (2013.01); *Y10T 428/1362* (2013.01); *B32B 3/10* (2013.01); *B32B 5/02* (2013.01); *B32B 5/26* (2013.01); *B32B 2255/02* (2013.01); *H02G 3/0481* (2013.01)

(58) Field of Classification Search
USPC .................. 442/203–217, 239, 243; 428/361; 66/170, 171; 139/384
See application file for complete search history.

(56) References Cited

U.S. PATENT DOCUMENTS

| | | | | |
|---|---|---|---|---|
| 3,478,991 | A | * 11/1969 | Bischoff et al. | ................. 245/10 |
| 4,025,684 | A | * 5/1977 | Neidhardt | ..................... 442/206 |
| 4,460,803 | A | 7/1984 | Piper | |

(Continued)

FOREIGN PATENT DOCUMENTS

| | | |
|---|---|---|
| DE | 2707705 A1 * | 8/1978 |
| GB | 2416781 A | 2/2006 |

(Continued)

OTHER PUBLICATIONS

European Search Report PCT/US2009030257 mailed on Sep. 3, 2012.

*Primary Examiner* — Jeremy R Pierce
*Assistant Examiner* — Ricardo E Lopez
(74) *Attorney, Agent, or Firm* — Robert L. Stearns; Dickinson Wright, PLLC

(57) ABSTRACT

A multilayer textile sleeve and method of construction thereof is provided. The sleeve has an outer layer constructed at least in part from a first warp yarn extending along a length direction of the sleeve and a weft yarn extending transversely to the length direction. The sleeve further includes an inner layer constructed at least in part from a second warp yarn extending along the length direction and a weft yarn extending transversely to the length direction, with the second warp yarn being a different type of yarn than the first warp yarn. The outer layer and inner layer are connected to one another by interlinking the weft yarn of the outer layer with at least some of the second warp yarns of the inner layer and by interlinking the weft yarn of the inner layer with at least some of the first warp yarns of the outer layer.

24 Claims, 9 Drawing Sheets

(56) References Cited

U.S. PATENT DOCUMENTS

| | | |
|---|---|---|
| 4,477,693 A | 10/1984 | Krabec et al. |
| 4,825,016 A | 4/1989 | Meltsch et al. |
| 5,294,270 A | 3/1994 | Fenical |
| 5,387,113 A | 2/1995 | Dickerson et al. |
| 5,532,429 A | 7/1996 | Dickerson et al. |
| 5,617,900 A | 4/1997 | Weil |
| 5,965,223 A * | 10/1999 | Andrews et al. ............ 428/34.5 |
| 6,262,371 B1 | 7/2001 | Allen |
| 6,589,468 B1 | 7/2003 | Schmitt |
| 6,718,100 B2 | 4/2004 | Morris |
| 6,876,797 B2 | 4/2005 | Morris |
| 2003/0010393 A1 * | 1/2003 | Kuji ........................ 139/383 A |
| 2006/0011384 A1 | 1/2006 | Kwong et al. |
| 2007/0166495 A1 * | 7/2007 | Sellis et al. .................. 428/36.1 |
| 2007/0243356 A1 | 10/2007 | Baer et al. |

FOREIGN PATENT DOCUMENTS

| | | |
|---|---|---|
| JP | 2005530061 | 10/2005 |
| JP | 2006521669 | 9/2006 |
| JP | 2008507636 | 3/2008 |
| JP | 2009529100 | 8/2009 |
| JP | 2009529101 | 8/2009 |
| WO | 2004086582 | 11/2004 |

\* cited by examiner

MULTILAYER PROTECTIVE TEXTILE SLEEVE AND METHOD OF CONSTRUCTION

CROSS-REFERENCE TO RELATED APPLICATION

This application claims the benefit of U.S. Provisional Application Ser. No. 61/019,458, filed Jan. 7, 2008, which is incorporated herein by reference in its entirety.

BACKGROUND OF THE INVENTION

1. Technical Field

This invention relates generally to protective textile sleeves, and more particularly to multilayer textile sleeves and their method of construction.

2. Related Art

It is known to first fabricate individual layers of textile material and then attach the individual layers to one another in a secondary operation to construct a single piece multilayer material. For example, if the desired multilayer material being constructed requires an inner layer to provide one type of property, such as low friction, and an outer layer to provide another type of property, such as insulation and/or abrasion resistance, one piece of textile material can be constructed in a first operation; a second piece of material can be constructed in a second operation, and then, the first and second pieces of material can be joined in a third operation to provide the single piece multilayer material. Although the end product is made having the desired properties, it comes at an expense, particularly given the manufacturing inefficiencies compiled over numerous operations.

SUMMARY OF THE INVENTION

A multilayer textile material is provided having a first layer constructed at least in part from one type of yarn and a second layer overlapped at least in part by the first layer, wherein the second layer is constructed at least in part from a second type of yarn that is different from the yarn used to construct the first layer. The first and second layers are integrally connected to one another in the process used to construct the first and second layers.

According to one aspect of the invention, weft yarns in the first layer hook warp yarns in the second layer, and weft yarns in the second layer hook warp yarns in the first layer to interlock the first and second layers to one another.

According to another aspect of the invention, the first and/or second layers have at least some warp yarns with different physical properties.

According to another aspect of the invention, the multilayer material has a third layer overlapped at least in part by the first and second layers, wherein the third layer is constructed in a single process with the first and second layers.

According to another aspect of the invention, the third layer has at least some warp yarns with different physical properties from the first and/or second layers.

According to another aspect of the invention, the multilayer material is formed into a protective tubular sleeve.

According to another aspect of the invention, at least one of the first, second or third layers provides the tubular sleeve with a circumferentially continuous conductive layer.

According to another aspect of the invention, the first and second or second and third layers are formed as a continuous tubular wall with the remaining layer extending outwardly from the tubular wall to a free end.

According to another aspect of the invention, the multilayer material has a fourth layer overlapped at least in part by the first, second and third layers, wherein the fourth layer is constructed in a single process with the first, second and third layers.

According to another aspect of the invention, the first and second layers are formed as a first continuous tubular wall and the third and fourth layers are formed as a second continuous tubular wall, wherein the first and second tubular walls are constructed in a single process.

According to another aspect of the invention, the first and second tubular walls provide a tubular sleeve having a dual layered wall.

According to another aspect of the invention, the first and second tubular walls provide a tubular sleeve having a four layered wall.

According to another aspect of the invention, a method of constructing a multilayer textile sleeve is provided. The method comprises weaving an outer layer having a first warp yarn extending along a length direction of the sleeve and a weft yarn extending substantially transversely to the length direction; weaving an inner layer having a second warp yarn extending along the length direction of the sleeve and a weft yarn extending substantially transversely to the length direction, and providing the second warp yarn as a different type of yarn than the first warp yarn, and connecting the outer layer and the inner layer to one another by interlinking the weft yarn of the outer layer with at least some of the second warp yarns of the inner layer and by interlinking the weft yarn of the inner layer with at least some of the first warp yarns of the outer layer.

BRIEF DESCRIPTION OF THE DRAWINGS

These and other aspects, features and advantages of a multilayer sleeve constructed in accordance with the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1A:
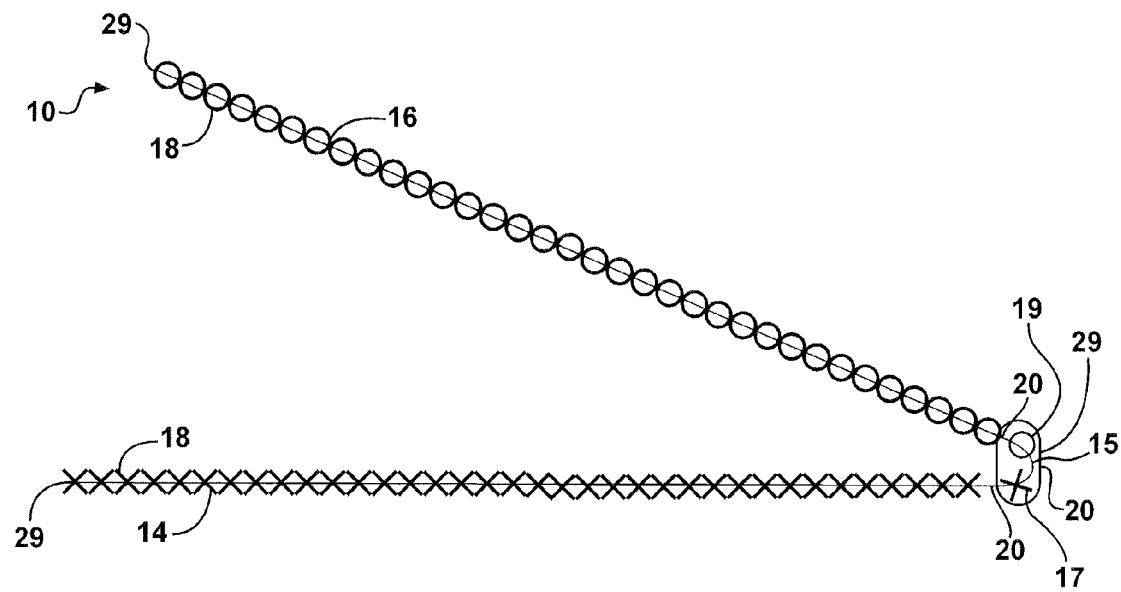
FIG. 1A is a diagrammatic end view of a multilayer material constructed in accordance with one embodiment of the invention.
Figure 1B:
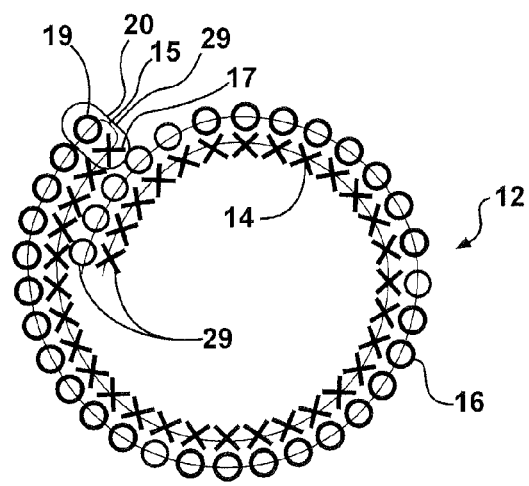
FIG. 1B is a diagrammatic end view of the material of FIG. 1A formed into a protective sleeve.

Referring in more detail to the drawings, FIGS. 1A-10A illustrate diagrammatically various textile materials 10 constructed in accordance with different embodiments of the invention, wherein FIGS. 1B-10B illustrate the respective materials 10 formed into protective sleeves 12. Each of the textile materials 10 is constructed having overlapping layers of yarn, wherein at least a portion of one of the layers is constructed with a different yarn type than the overlapped layer. Throughout the description, and as illustrated in the drawings, the different yarns types are designated by "X" and "O". The yarns are selected for each of the material layers to provide the material 10 and sleeves 12 formed therewith the desired properties, depending on their intended application of use. The different yarns are interlinked, such as by being woven with one another in a continuous, single weaving process, such that secondary operations are not needed to join the overlapping layers to one another. One weaving process contemplated herein for constructing the materials 10 is a dual pick insertion process, although other weaving processes are contemplated herein that provide a similar material in a single process.

In FIG. 1A, the material 10 is constructed having two generally equal length layers overlapping one another, with one layer being an inner layer 14 and the other being an outer layer 16. The layers 14, 16 are attached directly to one another generally along respective connection edges 17, 19 along a line 15 extending along a length of the material 10. The mechanism attaching the layers 14, 16 to one another is provided in the continuous weaving process in which the layers are woven, thereby negating the need for any secondary operations to attach the layers 14, 16 to one another. Each of the layers 14, 16 has warp-wise extending yarns 18, which extend along the length of the sleeve 12 (in and out of the page as shown in FIGS. 1-10), and weft-wise or fill yarns 20, which extend along the width of the sleeve 12 and thus, substantially transverse to the length of the sleeve 12.

Each of the layers 14, 16 is represented here as being constructed with different types of warp yarns 18, either monofilament or multifilament, with one layer forming the inner layer 14 and the other layer forming the outer layer 16. The warp yarns 18 (designated by "X", representing one type of yarn) in the inner layer 14 are provided as a non-abrasive, slick and insulative yarns so as to provide insulation to wires or other elongate members with a cavity of the sleeve 12, while also allowing the elongate members to be easily installed within the cavity without causing damage to the elongate members. In contrast, the warp yarns 18 (designated by "O", representing another type of yarn different from the "X" type of yarn) in the outer layer 16 are provided having any suitable color, for appearance purposes, and having high abrasion resistance and insulative properties to protect the elongate members within the cavity of the sleeve 12.

The weft yarns 20 can be provided having any desired properties in each of the layers 14, 16, as desired. To facilitate heat forming the material 10 into a self-curling, tubular sleeve, the weft yarns 20 can be provided of any heat settable monofilament, such as PET, for example. At least some of the weft filaments 20 of the inner layer 14 are interlocked or interlinked with at least some of the warp yarns 18 of the outer layer 16, and at least some of the weft yarns 20 of the outer layer 16 are interlocked or interlinked with at least some of the warp yarns 18 of the inner layer 14 to interlock the connection edges 17, 19 with one another and to provide the material 10 as a unitary, single piece member in a single manufacturing process.

The material 10, preferably having heat formable weft yarns 20, can be heat formed or set in a heat-setting process into the desired, substantially closed tubular sleeve shape, wherein the inner layer 14 preferably overlaps the outer layer 16 in a so called "cigarette wrap" form to circumferentially enclose the elongate members within the cavity of the sleeve 12. Although the sleeve 12 is ultimately substantially closed, it should be recognized that the sleeve 12 is an open-type sleeve, which means the sleeve 12 is not constructed having a circumferentially closed wall, but rather, has overlapping free edges 29 extending along the length of the sleeve 12 that can be biased away from one another into an open configuration allowing access to the cavity of the sleeve. Of course, rather than heat-setting the material into the tubular sleeve configuration, fasteners could be provided along a longitudinal seam of the sleeve, such as a hook and loop fastener, for example, thereby allowing the material to be manually wrapped in use and fastened about the elongate members.

Figure 2A:
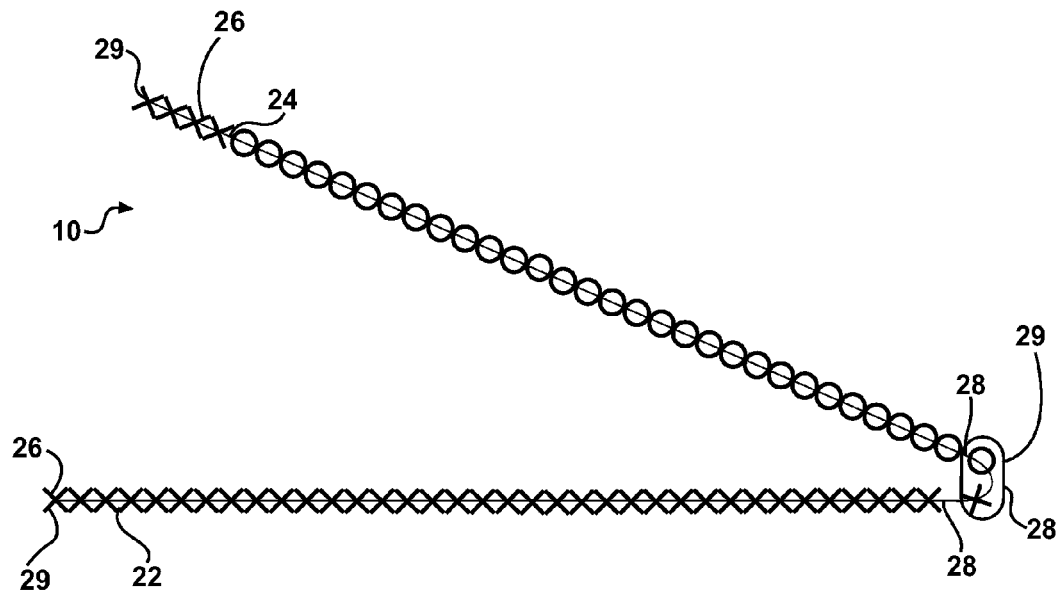
FIG. 2A is a diagrammatic end view of a multilayer material constructed in accordance with another embodiment of the invention.
Figure 2B:
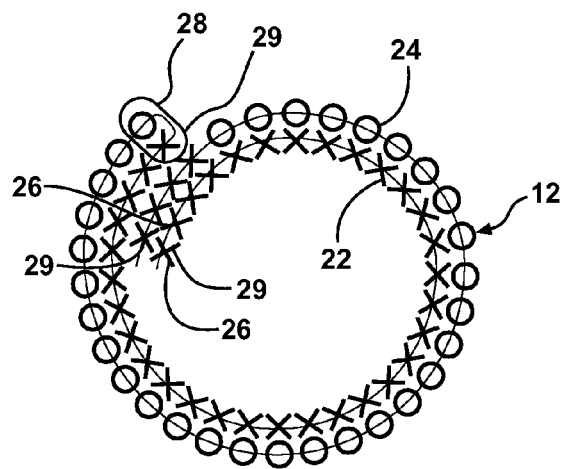
FIG. 2B is a diagrammatic end view of the material of FIG. 2A formed into a protective sleeve.

As shown in FIGS. 2A and 2B, another material 10 and sleeve 12 is shown constructed according to another embodiment of the invention. The material 10 has an inner layer 22 and an outer layer 24, wherein each of the respective layers 22, 24 has warp-wise extending yarns 26 and weft-wise or fill yarns 28. The warp yarns 26 (designated by "X", representing one type of yarn) of the inner layer 22 are provided as conductive yarns to provide EMI protection to the elongate members within the cavity of the sleeve 12, while at least some of the warp yarns 26 (designated by "O", representing a different type of yarn than that designated by "X") of the outer layer 24 are provided as different types of yarns. The warp yarns 26 (designated by "X") adjacent the free end 29 of the outer layer 24 can be provided as conductive yarns, and can be the same type as used in the inner layer 22, while the remaining warp yarns 26 (designated by "O") of the outer layer 24 are provided having any suitable color, for appearance purposes, and having high abrasion resistance and insulative properties to protect the elongate members within the cavity of the sleeve 12.

As shown in FIG. 2B, when the material 10 is cigarette wrapped, the conductive warp yarns 26 ("X") of the outer layer 24 adjacent the free edge 29 are brought into engagement with the conductive warp yarns 26 ("X") of the inner layer 22 to provide a complete, circumferential conductive layer or inner wall about the elongate members within the cavity of the sleeve 12. The remaining non-conductive warp yarns 26 ("O") of the outer layer 24 extend completely circumferentially about the outer surface of the sleeve 12 to provide an outer wall having abrasion resistance and insulative properties to the sleeve 12.

Figure 3A:
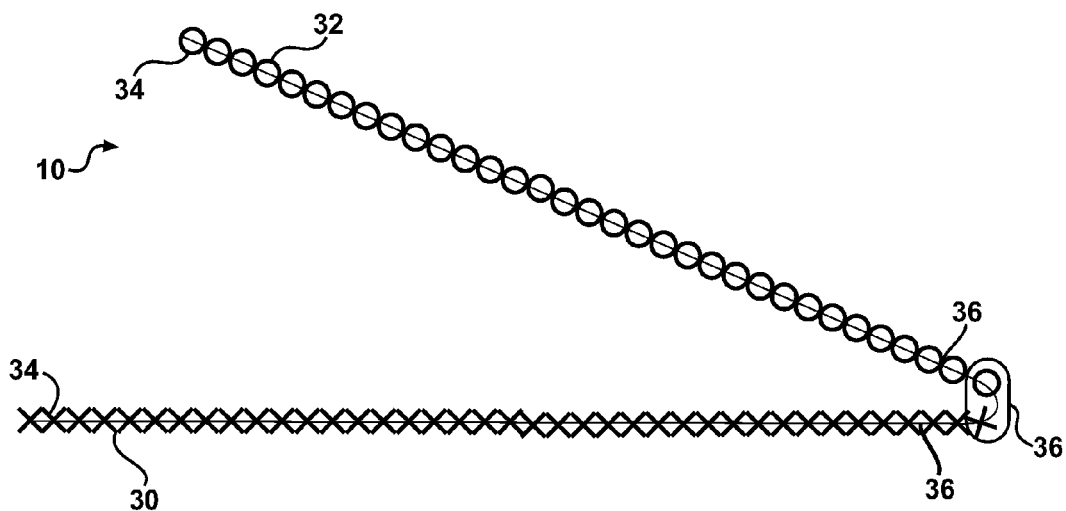
FIG. 3A is a diagrammatic end view of a multilayer material constructed in accordance with yet another embodiment of the invention.
Figure 3B:
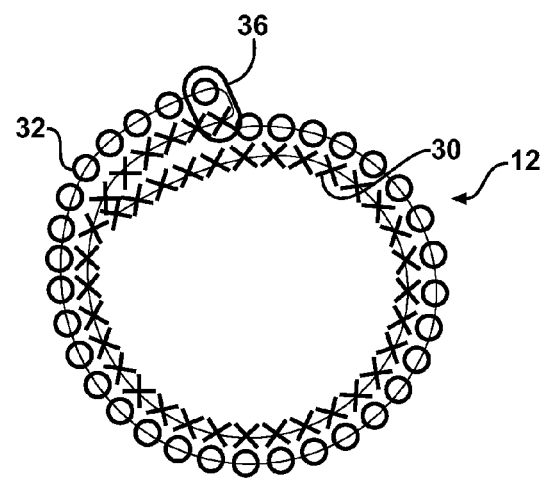
FIG. 3B is a diagrammatic end view of the material of FIG. 3A formed into a protective sleeve.

As shown in FIGS. 3A and 3B, another material 10 and sleeve 12 is shown constructed according to another embodiment of the invention. The material 10 has an inner layer 30 and an outer layer 32, wherein each of the respective layers 30, 32 has warp-wise extending yarns 34 and weft-wise or fill yarns 36. The inner and outer layers 30, 32 are constructed similarly as described above in connection with the inner and outer layers 14, 16, however, the inner layer 30 is constructed having an increased width extending along a direction transverse to the length of the sleeve 12 relative to the outer layer 32. As in the previous embodiment, the warp yarns 34 of the inner layer 30 are provided as conductive yarns ("X"), whether coated with metal or in wire filament form, while the warp yarns 34 of the outer layer 32 are provided as non-conductive warp yarns ("O"). Accordingly, upon being cigarette wrapped, the inner layer 30 extends completely circumferentially into electrical communication with itself to provide complete EMI protection circumferentially about the elongate members within the sleeve 12. Meanwhile, the outer layer 32 preferably extends completely circumferentially about the inner conductive yarns ("X") to provide complete abrasion resistance and insulative properties to the inner conductive yarns and elongate members being protected within the sleeve 12.

Figure 4A:
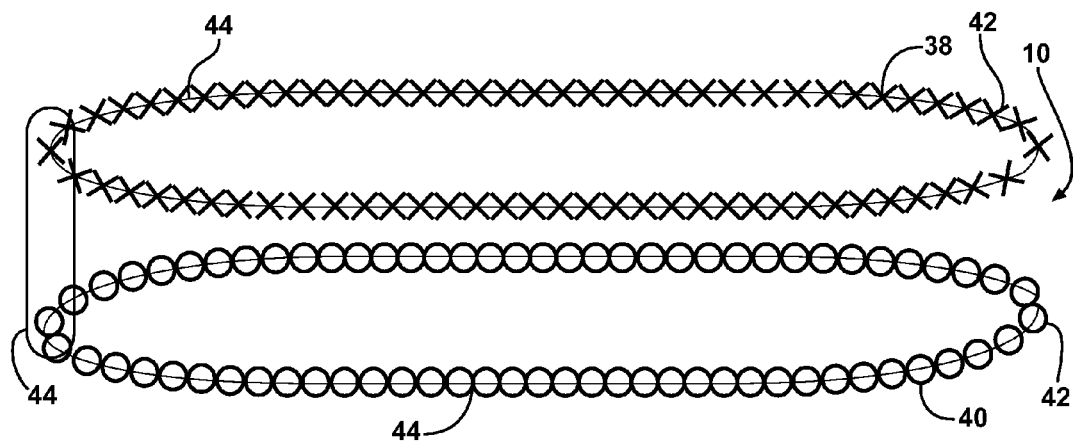
FIG. 4A is a diagrammatic end view of a multilayer material constructed in accordance with yet another embodiment of the invention.
Figure 4B:
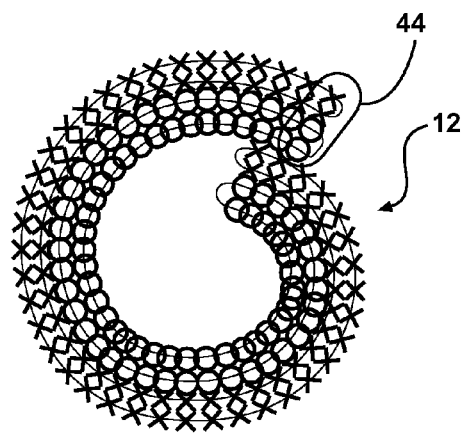
FIG. 4B is a diagrammatic end view of the material of FIG. 4A formed into a protective sleeve.

As shown in FIGS. 4A and 4B, another material 10 and sleeve 12 is shown constructed according to another embodiment of the invention. The material 10 has an inner layer 38 and an outer layer 40, wherein each of the respective layers 38, 40 has warp-wise extending yarns 42 and weft-wise or fill yarns 44. Both the inner and outer layers 38, 40 are woven as a tubular configurations. The tubular inner layer 38 is attached to the tubular outer layer 40 via the weft yarns 44 in each the inner and outer layers 38, 40 being hooked or linked about respective warp yarns 42 extending along the length of the inner and outer layers. The tubular inner layer 38 is represented as being woven with electrically conductive warp yarns 42 ("X"), while the tubular outer layer is woven with abrasion resistant, insulative warp yarns 42 ("O"), as discussed above.

As shown in FIG. 4B, upon being cigarette-wrapped, the inner and outer layers 38, 40 provide a wall having four discrete layers. Two of the layers of the sleeve wall are formed from the inner layer 38 and two of the layers are formed from the outer layer 40.

Figure 5A:
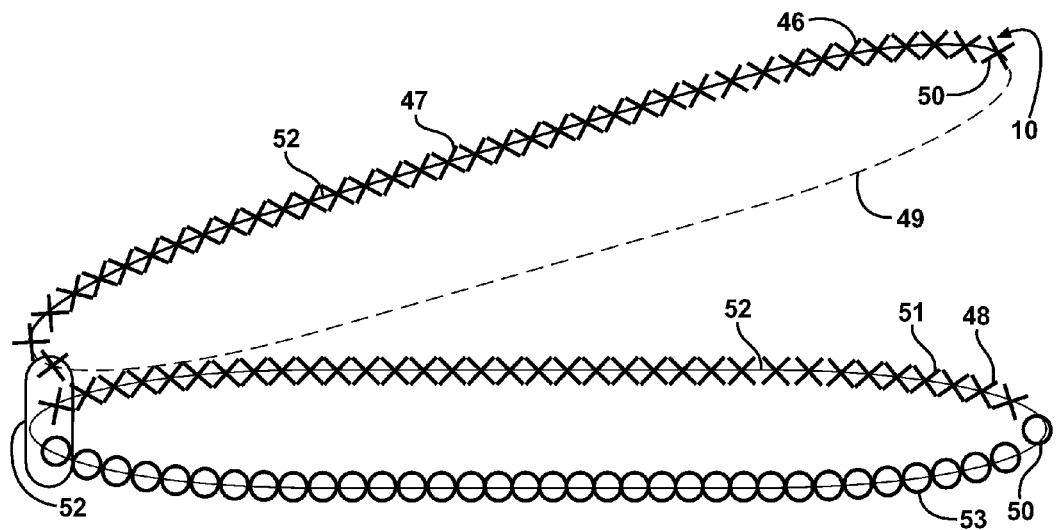
FIG. 5A is a diagrammatic end view of a multilayer material constructed in accordance with yet another embodiment of the invention.
Figure 5B:
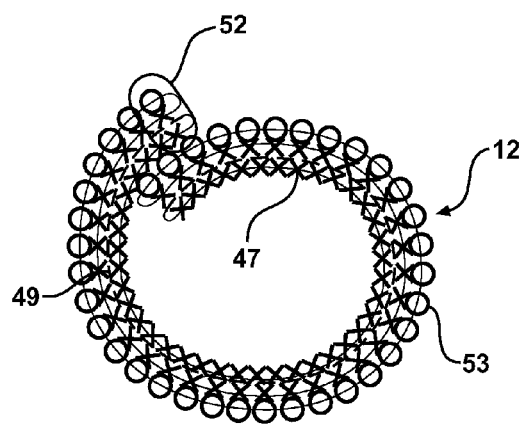
FIG. 5B is a diagrammatic end view of the material of FIG. 5A formed into a protective sleeve.

As shown in FIGS. 5A and 5B, another material 10 and sleeve 12 is shown constructed according to another embodiment of the invention. The material 10 has an inner layer 46 and an outer layer 48, wherein each of the respective layers 46, 48 has warp-wise extending yarns 50 and weft-wise or fill yarns 52. The inner and outer layers 46, 48 are formed similarly as described above in connection with FIGS. 4A, 4B, however, at least one or both layers 46, 48 are formed with their respective warp yarns 50 being of different types. For example, the tubular inner layer 46 can have its innermost layer 47 formed with non-abrasive, electrically conductive yarns ("X"), while the outermost layer 49 of the inner layer 46 can be formed with different electrically conductive yarns ("—") or otherwise, as desired. The tubular outer layer 48 can be formed with an innermost layer 51 of non-abrasive, electrically conductive yarns ("X") or otherwise, as desired, while the outermost layer 53 of the outer layer 48 can be formed with abrasion resistant, colored, insulative yarns ("O"), as described above.

Figure 6A:
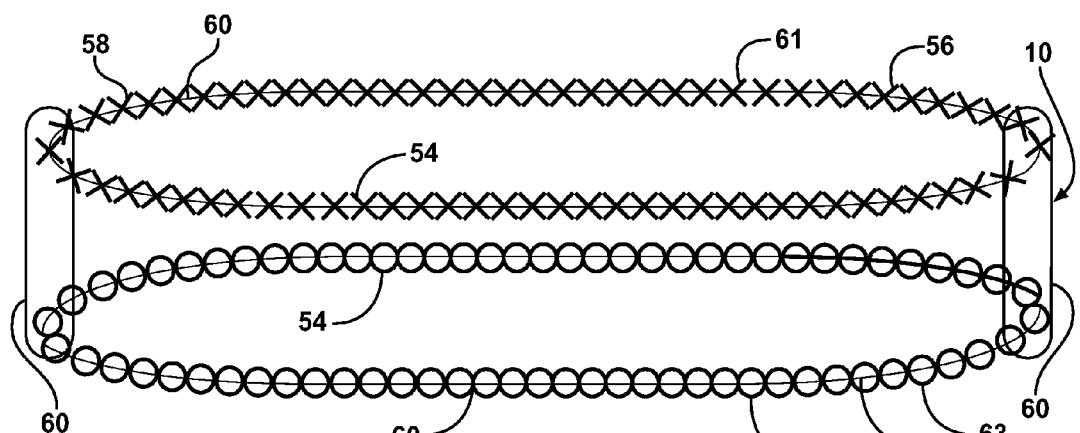
FIG. 6A is a diagrammatic end view of a multilayer material constructed in accordance with yet another embodiment of the invention.
Figure 6B:
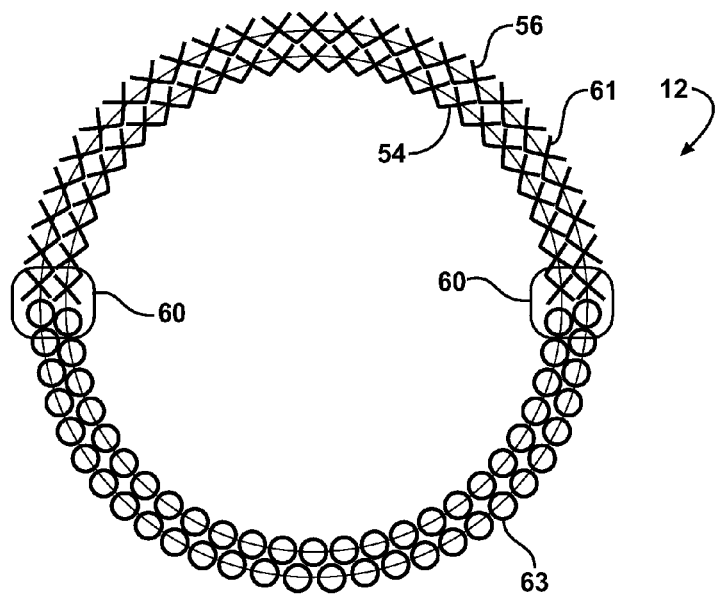
FIG. 6B is a diagrammatic end view of the material of FIG. 6A formed into a protective sleeve.

As shown in FIGS. 6A and 6B, another material 10 and sleeve 12 is shown constructed according to another embodiment of the invention. The material 10 has an inner layer 54 and an outer layer 56, wherein each of the respective layers 54, 56 has warp-wise extending yarns 58 and weft-wise or fill yarns 60. The inner layer 54 is formed by inner-most portions of two separate tubular sections 61, 63, and the outer layer 56 is formed by outer-most portions of the tubular sections 61, 63. The tubular sections 61, 63 are joined at diametrically opposite sides by weft yarns 60 looping about warp yarns 58, as discussed above.

As shown in FIG. 6B, the tubular sections 61, 63 are moved outwardly from one another to form the inner cavity of the sleeve 12. The tubular section 61 is illustrated as being formed with one type of warp yarns, such as abrasion resistant, insulative yarns ("X"), while the other tubular section 63 is illustrated as being formed with another type of warp yarns, such as non-abrasive, slick and insulative yarns ("O"), for example. As such, the inner layer 56 is provided both abrasion resistant, insulative warp yarns ("X") and non-abrasive, slick and insulative warp yarns ("O").

Figure 7A:
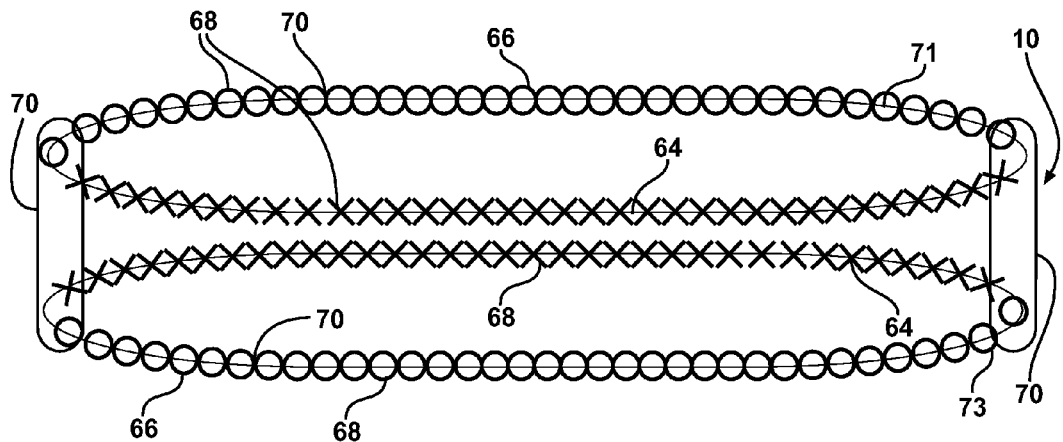
FIG. 7A is a diagrammatic end view of a multilayer material constructed in accordance with yet another embodiment of the invention.
Figure 7B:
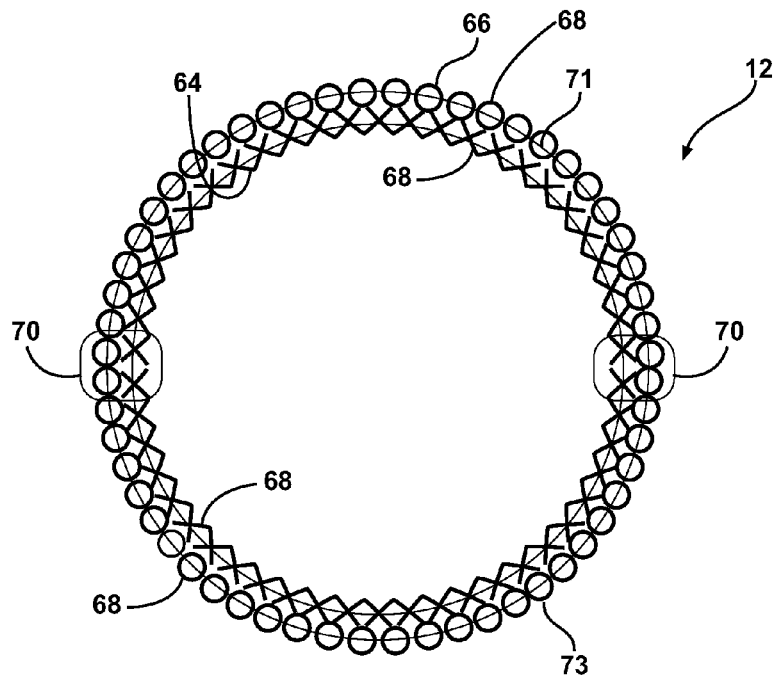
FIG. 7B is a diagrammatic end view of the material of FIG. 7A formed into a protective sleeve.

As shown in FIGS. 7A and 7B, another material 10 and sleeve 12 is shown constructed according to another embodiment of the invention. The material 10 has an inner layer 64 and an outer layer 66, wherein each of the respective layers 64, 66 has warp-wise extending yarns 68 and weft-wise or fill yarns 70. As with the embodiment discussed in connection with FIGS. 6A, 6B, the inner layer 64 is formed by inner-most portions of two separate tubular sections 71, 73 and the outer layer 66 is formed by outer-most portions of the tubular sections 71, 73. The tubular sections 71, 73 are joined at diametrically opposite sides by selected weft yarns 70 looping about selected warp yarns 68, as discussed above.

As shown in FIG. 7B, the tubular sections 71, 73 are moved outwardly from one another to form the inner cavity of the sleeve 12. The tubular sections 71, 73 are each illustrated as being formed with two types of warp yarns, such as abrasion resistant, insulative yarns ("O"), and non-abrasive, slick and insulative yarns ("X"), for example. With the configuration of the different types of warp yarns 68 within the separate tubular sections 71, 73, the inner layer 64 is provided entirely with the non-abrasion, slick and insulative yarns ("X") and the outer layer 66 is provided with the abrasion resistant, insulative warp yarns ("O").

Figure 8A:
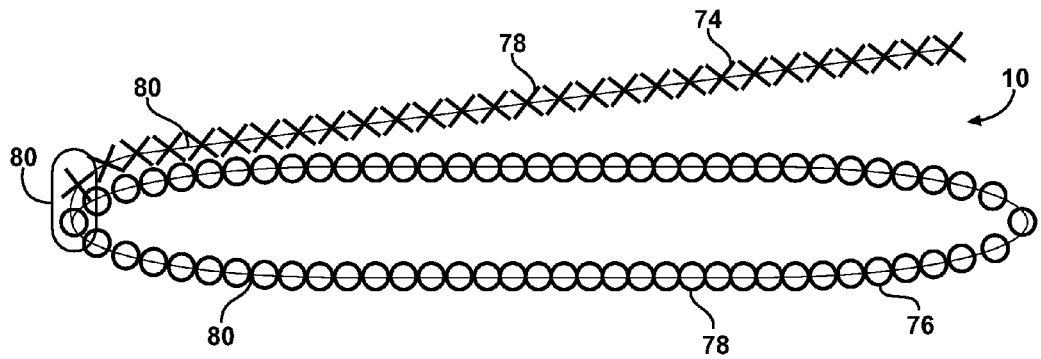
FIG. 8A is a diagrammatic end view of a multilayer material constructed in accordance with yet another embodiment of the invention.
Figure 8B:
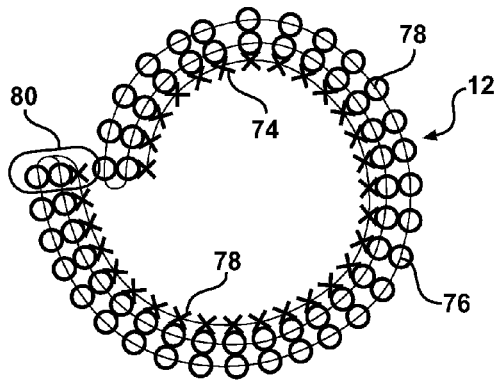
FIG. 8B is a diagrammatic end view of the material of FIG. 8A formed into a protective sleeve.

As shown in FIGS. 8A and 8B, another material 10 and sleeve 12 is shown constructed according to another embodiment of the invention. The material 10 has an inner layer 74 and an outer layer 76, wherein each of the respective layers 74, 76 has warp-wise extending yarns 78 and weft-wise or fill yarns 80. The inner layer 74 is formed as a single layer, while the outer layer 76 is formed as a tubular section having two opposing layers. Similarly as described above, the inner layer 74 and outer layer 76 are constructed integrally with one another in a single weaving operation via weft yarns 80 from each layer 74, 76 looping about warp yarns 78 from the other respective layer 74, 76. As shown, the interconnection of the inner and outer layers 74, 76 forms an elongate edge 81 of the material 10.

As shown in FIG. 8B, the material 10 is cigarette wrapped with the inner layer 74 facing inwardly to form an inner cavity, while the outer layer 76 faces outwardly. The inner layer 74 is preferably formed with non-abrasion, slick and insulative warp yarns 78 ("X") and the outer layer 76 is provided with abrasion resistant, insulative warp yarns 78 ("O"). Accordingly, as discussed above in connection with the other embodiments, the inner layer allow easy installation of the elongate members into the cavity without causing damage, while the outer layer 76 provides the necessary protection against abrasion and thermal conditions.

Figure 9A:
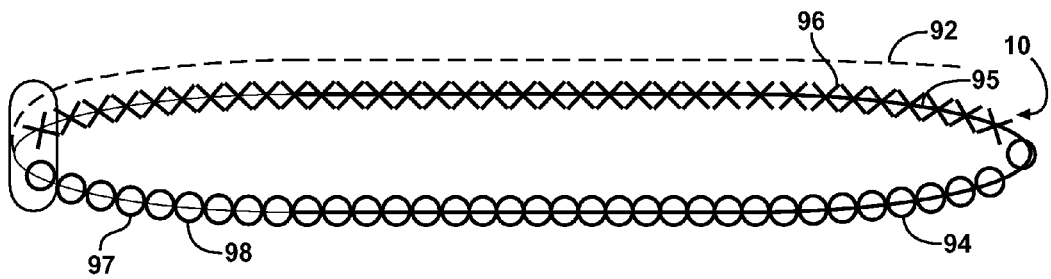
FIG. 9A is a diagrammatic end view of a multilayer material constructed in accordance with yet another embodiment of the invention.
Figure 9B:
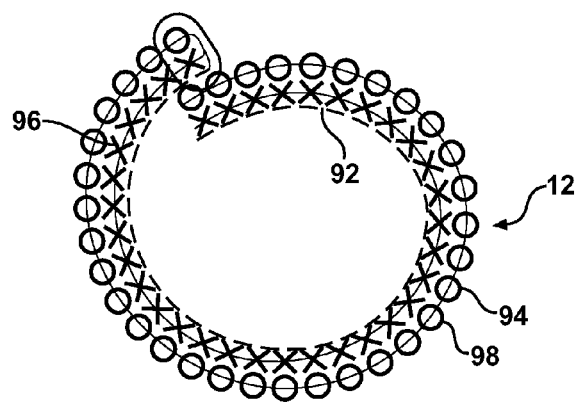
FIG. 9B is a diagrammatic end view of the material of FIG. 9A formed into a protective sleeve.

As shown in FIGS. 9A and 9B, another material 10 and sleeve 12 is shown constructed according to another embodiment of the invention. The material 10 is similar to the material shown in FIGS. 8A and 8B, having a single ply inner layer 92 and a tubular, two layered outer layer 94. However, the outer layer 94, rather than being formed with the same warp yarns throughout, has an innermost layer 95 formed of one type of warp yarn 96, such as electrically conductive yarns ("X"), and an outermost layer 97 formed of a different type of warp yarns 98, such as colored, abrasion resistant and insulative yarns ("O"). Otherwise the material and sleeve formed therefrom is similar to that discussed and shown in connection with FIGS. 8A and 8B.

Figure 10A:
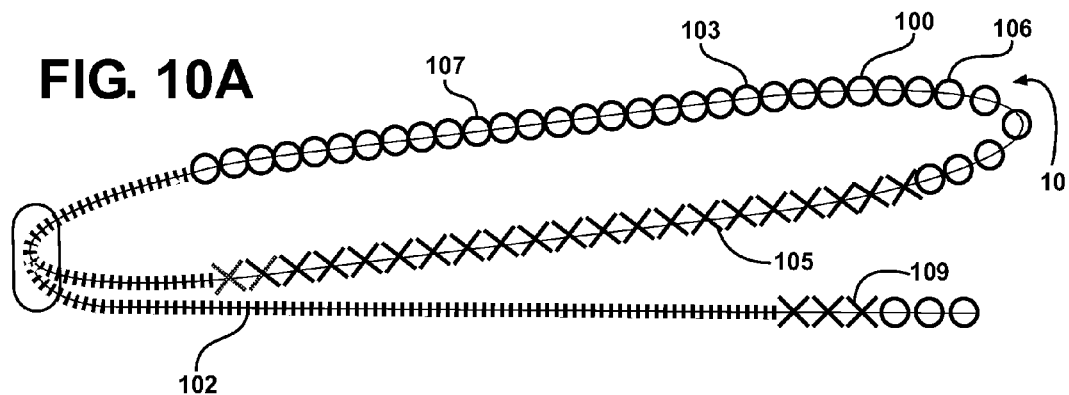
FIG. 10A is a diagrammatic end view of a multilayer material constructed in accordance with yet another embodiment of the invention.
Figure 10B:
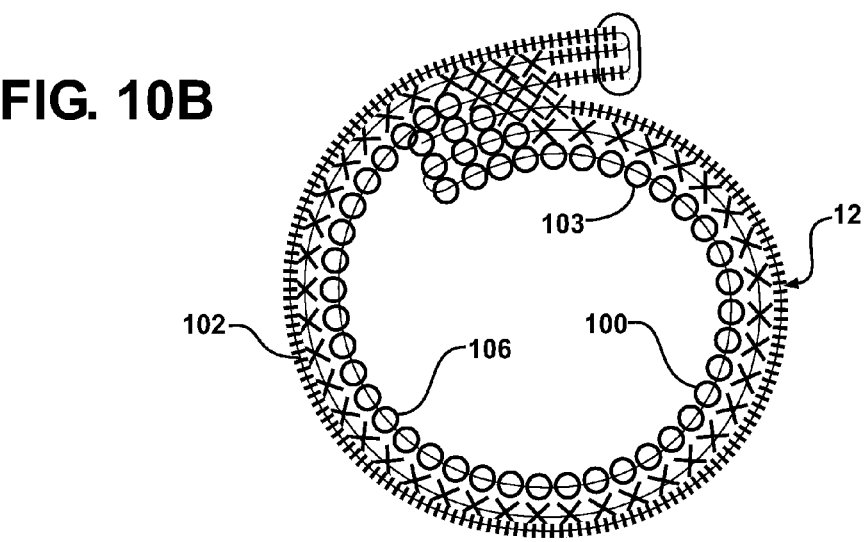
FIG. 10B is a diagrammatic end view of the material of FIG. 10A formed into a protective sleeve.

As shown in FIGS. 10A and 10B, another material 10 and sleeve 12 is shown constructed according to another embodiment of the invention. The material 10 is similar to the material shown in FIGS. 9A and 9B, having a single ply layer and a tubular, two ply layer, however, the tubular layer provides an inner layer 100 and the single ply layer forms an outer layer 102. The tubular inner layer 100 is formed with an innermost layer 103 formed substantially of one type of warp yarn 106, such as non-abrasive, slick or lubricious yarns ("O"). However, the innermost layer 103 has at least a portion constructed with electrically conductive warp yarns 107 ("X") adjacent one of its ends. The inner layer 100 further includes an outermost layer 105 formed substantially of electrically conductive warp yarns ("X"). The single ply outer layer 102 is attached at one end to the tubular layer 100, via interlocking weft and warp yarns, as described above in the various embodiments, and is formed with warp yarns differing from the inner layer warp yarns at least in part, wherein the outer layer warp yarns can be colored, abrasion resistant and insulative yarns. However, the outer layer 100 has electrically conductive warp yarns 109 adjacent a free end configured for mating electrical engagement with the electrically conductive yarns 107 in the innermost layer 103 of the inner layer 100. Accordingly, a complete circumferential electrically conductive blanket is formed about elongate members with a cavity of the sleeve 12 by the electrical communication established between the conductive warp yarns 107 in the innermost layer 103, the conductive warp yarns 109 in the outer layer 102, and the conductive warp yarns in the outermost layer 105 upon wrapping the material 10 in a cigarette wrapped overlapping fashion.

Obviously, many modifications and variations of the present invention are possible in light of the above teachings. It is, therefore, to be understood that within the scope of any claims stemming from this disclosure, the invention may be practiced otherwise than as specifically described.

What is claimed is:

1. A multilayer textile sleeve, comprising:
   an outer layer constructed at least in part from a first warp yarn extending along a length direction of said sleeve and a weft yarn extending substantially transversely to said length direction;
   an inner layer constructed at least in part from a second warp yarn extending along said length direction of said sleeve and a weft yarn extending substantially transversely to said length direction, said second warp yarn being a different type of yarn than said first warp yarn;
   said outer layer and said inner layer being connected to one another by said weft yarn of said outer layer being woven with at least some of said second warp yarns of said inner layer with said second warp yarns of said inner layer remaining entirely within said inner layer and by said weft yarn of said inner layer being woven with at least some of said first warp yarns of said outer layer with said first warp yarns of said outer layer remaining entirely within said outer layer; and
   wherein said sleeve is a circumferentially open sleeve having opposite lengthwise extending edges overlapped circumferentially with one another with said inner layer and said outer layer each having free edges extending adjacent one another along said length direction of said sleeve in detached relation from one another and opposite connection edges extending along said length direction of said sleeve, said connection edges being attached to one another by said weft yarns of said inner and outer layers.

2. The multilayer textile sleeve of claim 1 wherein at least some of said weft yarns are heat set causing said inner and outer layers to be biased into a self-curled cigarette configuration.

3. The multilayer textile sleeve of claim 1 wherein said second warp yarn is an electrically conductive yarn and at least some of said first warp yarn is a non-conductive, insulative yarn.

4. The multilayer textile sleeve of claim 3 wherein at least some of said first warp yarn is a conductive yarn.

5. The multilayer textile sleeve of claim 4 wherein said conductive yarn of said outer layer is arranged in electrical communication with said conductive yarn of said inner layer to provide said sleeve with a circumferentially continuous, electrically conductive wall.

6. The multilayer textile sleeve of claim 1 wherein said inner layer has two layers and said outer layer has two layers, said inner and outer layers providing said sleeve with a wall of four layers.

7. The multilayer textile sleeve of claim 6 wherein said two layers of said inner layer are constructed at least in part of different types of warp yarn.

8. The multilayer textile sleeve of claim 7 wherein said two layers of said outer layer are constructed of different types of warp yarn.

9. The multilayer textile sleeve of claim 1 wherein said inner layer has a greater width than said outer layer.

10. The multilayer textile sleeve of claim 1 wherein said sleeve has a pair of tubular sections extending along said length direction and said outer and inner layers are formed from separate portions of each tubular section.

11. The multilayer textile sleeve of claim 10 wherein said inner layer is formed as a circumferentially continuous, electrically conductive layer.

12. The multilayer textile sleeve of claim 11 wherein said outer layer is formed as a circumferentially continuous, non-conductive, insulative layer.

13. A method of constructing a multilayer textile sleeve, comprising:
   weaving an outer layer having a first warp yarn extending along a length direction of the sleeve and a weft yarn extending substantially transversely to the length direction;
   weaving an inner layer having a second warp yarn extending along the length direction of the sleeve and a weft yarn extending substantially transversely to the length direction, and providing the second warp yarn as a different type of yarn than the first warp yarn, and connecting the outer layer and the inner layer to one another by interlinking the weft yarn of the outer layer with at least some of the second warp yarns of the inner layer and by interlinking the weft yarn of the inner layer with at least some of the first warp yarns of the outer layer; and wherein said sleeve is a circumferentially open sleeve having opposite lengthwise extending edges overlapped circumferentially with one another with said inner layer and said outer layer each having free edges extending adjacent one another along said length direction of said sleeve in detached relation from one another and opposite connection edges extending along said length direction of said sleeve, said connection edges being attached to one another by said weft yarns of said inner and outer layers.

14. The method of claim 13 further including heat setting at least some of the weft yarns and causing the inner and outer layers to be biased into a self-curled cigarette configuration.

15. The method of claim 13 further including providing the second warp yarn as an electrically conductive yarn and providing at least some of the first warp yarn as a non-conductive, insulative yarn.

16. The method of claim 15 further including providing at least some of the first warp yarn as a conductive yarn.

17. The method of claim 16 further including configuring the conductive yarn of the outer layer for electrical communication with the conductive yarn of the inner layer to provide the sleeve with a circumferentially continuous, electrically conductive wall.

18. The method of claim 13 further including constructing the inner layer having two overlapping layers and constructing the outer layer having two overlapping layers.

19. The method of claim 18 further including constructing the two layers of the inner layer at least in part with different types of warp yarn.

20. The method of claim 19 further including constructing the two layers of the outer layer at least in part with different types of warp yarn.

21. The method of claim 13 further including constructing the inner layer having a greater width than the outer layer.

22. The method of claim 13 wherein further including constructing the sleeve having a pair of tubular sections extending along the length direction and forming the outer and inner layers from separate portions of each tubular section.

23. The method of claim 22 further including constructing the inner layer as a circumferentially continuous, electrically conductive layer.

24. The method of claim 23 further including constructing the outer layer as a circumferentially continuous, nonconductive, insulative layer.

* * * * *